United States Patent
Ji et al.

(10) Patent No.: US 10,853,667 B2
(45) Date of Patent: Dec. 1, 2020

(54) METHOD AND APPARATUS WITH LINEARITY DETECTION

(71) Applicant: Samsung Electronics Co., Ltd., Suwon-si (KR)

(72) Inventors: Dae Hyun Ji, Hwaseong-si (KR); Dokwan Oh, Hwaseong-si (KR); Jahoo Koo, Seoul (KR); Dongwook Lee, Hwaseong-si (KR); Wonju Lee, Suwon-si (KR); Jaewoo Lee, Hwaseong-si (KR); Cheolhun Jang, Pohang-si (KR); Yoonsuk Hyun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 99 days.

(21) Appl. No.: 16/166,504

(22) Filed: Oct. 22, 2018

(65) Prior Publication Data

US 2019/0205663 A1    Jul. 4, 2019

(30) Foreign Application Priority Data

Dec. 29, 2017  (KR) .......................... 10-2017-0184372

(51) Int. Cl.
*G06K 9/00* (2006.01)
*G05D 1/02* (2020.01)
*G06K 9/32* (2006.01)
*G01S 19/07* (2010.01)

(52) U.S. Cl.
CPC .......... *G06K 9/00798* (2013.01); *G01S 19/07* (2013.01); *G05D 1/0212* (2013.01); *G06K 9/3241* (2013.01)

(58) Field of Classification Search
CPC .. G06K 9/00798; G06K 9/3241; G01S 19/07; G05D 1/0212; G05D 2201/0213; G05D 1/0246; G08G 1/09626; G08G 1/167
See application file for complete search history.

(56) References Cited

U.S. PATENT DOCUMENTS

| | | | |
|---|---|---|---|
| 2001/0003436 A1* | 6/2001 | Yoshikawa | .......... B60K 28/066 340/439 |
| 2002/0095246 A1* | 7/2002 | Kawazoe | ............. B62D 15/025 701/1 |
| 2010/0292886 A1* | 11/2010 | Szczerba | ............... G01S 13/723 701/31.4 |
| 2011/0125811 A1 | 5/2011 | Witmer | |

(Continued)

FOREIGN PATENT DOCUMENTS

| | | |
|---|---|---|
| JP | 5625094 B2 | 11/2014 |
| JP | 6088251 B2 | 3/2017 |

(Continued)

*Primary Examiner* — Ming Y Hon
(74) *Attorney, Agent, or Firm* — Sughrue Mion, PLLC

(57) ABSTRACT

Disclosed is a method and apparatus that includes acquiring a driving image; acquiring positioning information indicating a location of a vehicle; extracting map information corresponding to the positioning information; determining a regression line function corresponding to a road on which the vehicle is traveling based on the map information; detecting the linearity of the road from the driving image using the regression line function; and indicating the detected linearity.

20 Claims, 10 Drawing Sheets

(56) References Cited

U.S. PATENT DOCUMENTS

| | | | | |
|---|---|---|---|---|
| 2015/0109119 A1* | 4/2015 | Hanita | ................. | B62D 15/029 340/438 |
| 2015/0161454 A1* | 6/2015 | Han | ................... | G06K 9/00798 382/104 |
| 2015/0336510 A1* | 11/2015 | Imai | ...................... | G08G 1/167 348/148 |
| 2019/0061808 A1* | 2/2019 | Mizoguchi | ............. | G01C 21/26 |

FOREIGN PATENT DOCUMENTS

| | | |
|---|---|---|
| KR | 10-2009-0027385 A | 3/2009 |
| KR | 10-1723536 B1 | 4/2017 |
| KR | 10-2017-0083462 A | 7/2017 |

\* cited by examiner

METHOD AND APPARATUS WITH LINEARITY DETECTION

CROSS-REFERENCE TO RELATED APPLICATIONS

This application claims the benefit under 35 USC § 119(a) of Korean Patent Application No. 10-2017-0184372 filed on Dec. 29, 2017 in the Korean Intellectual Property Office, the entire disclosure of which is incorporated herein by reference for all purposes.

BACKGROUND

1. Field

The following description relates to a method and apparatus with linearity detection based on map information.

2. Description of Related Art

Visual information augmentation technologies are provided to assist steering of a vehicle and other transportation means. In such technology, various methods are used to extract a lane marking or road information from a driving image.

When pixel information on a long distance image is limited or insufficient, a situation in which lane detection is difficult may occur in a road environment due to, for example, a lane occluded by an object. When accurate lane detection is not performed, difficulties may arise in the providing of accurate information for the driving of the vehicle such as during the vehicle control, route determination, and the like.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes acquiring a driving image and positioning information indicating a location of a vehicle; extracting map information corresponding to the positioning information; determining a regression line function corresponding to a road on which the vehicle is traveling based on the map information; detecting the linearity of the road from the driving image using the regression line function; and indicating the detected linearity.

The determining of the regression line function may include determining the regression line function using either one or both of destination information and global waypoints corresponding to the positioning information on a map, included in the map information.

The determining of the regression line function may include determining any one or any combination of any two or more of a degree of the regression line function, a regression weight of the regression line function, and a lane weight using either one or both of the destination information and the global waypoints, and detecting the linearity using the degree of the regression line function, the regression weight of the regression line function, and/or the lane weight.

The determining of the regression line function may include recognizing a road shape on the map using the global waypoints; and determining the degree of the regression line function based on the road shape.

The determining of the regression line function may include assigning the regression weight of the regression line function through a regression analysis on the global waypoints.

The determining of the regression line function may include recognizing a road shape on the map using the global waypoints; determining whether the road shape comprises multiple lanes; and in response to determining whether the road shape comprises multiple lanes, assigning a lane weight of a lane matching the destination information among the multiple lanes.

The extracting of the map information may include extracting global waypoints corresponding to the positioning information on a map, included in the map information.

The extracting of the global waypoints may include extracting global waypoints located within a predetermined look-ahead distance from the positioning information.

The predetermined look-ahead distance may be determined based on either one or both of a speed and a destination of the vehicle.

The acquiring of the positioning information may include acquiring the positioning information using a global positioning system (GPS) sensor.

The method may further include determining a local path of the vehicle based on the detected line; generating information for driving of the vehicle based on the local path; and outputting the information for driving of the vehicle.

The generating of the information for driving of the vehicle may include generating a control parameter for controlling any one or any combination of any two or more of a driving direction of the vehicle, a wheel steering angle of the vehicle, and a speed of the vehicle based on the local path of the vehicle.

A non-transitory computer-readable storage medium storing instructions that, when executed by a processor, may cause the processor to perform the method described above.

In another general aspect, an apparatus for detecting linearity includes a sensor and a processor. The sensor is configured to acquire a driving image and positioning information indicating a location of a vehicle. The processor is configured to: extract map information corresponding to the positioning information; determine a regression line function corresponding to a road on which the vehicle is traveling based on the map information; detect the linearity of the road from the driving image using the regression line function; and indicate linearity of the road.

The processor may be further configured to determine the regression line function using either one or both of destination information and global waypoints corresponding to the positioning information on a map, included in the map information.

The processor may be further configured to determine any one or any combination of any two or more of a degree of the regression line function, a regression weight of the regression line function, and a lane weight using either one or both of the destination information and the global waypoints, and detect the linearity using the degree of the regression line function, the regression weight of the regression line function, and/or the lane weight.

The processor may be further configured to recognize a road shape on the map using the global waypoints and determine the degree of the regression line function based on the road shape.

The processor may be further configured to assign the regression weight of the regression line function through a regression analysis on the global waypoints.

The processor may be further configured to: recognize a road shape on the map using the global waypoints; determine whether the road shape comprises multiple lanes; and in response to determining whether the road shape comprises multiple lanes, assign a lane weight of a lane matching the destination information among the multiple lanes.

The processor may be further configured to extract global waypoints corresponding to the positioning information on a map, included in the map information.

Other features and aspects will be apparent from the following detailed description, the drawings, and the claims.

Figure 1:
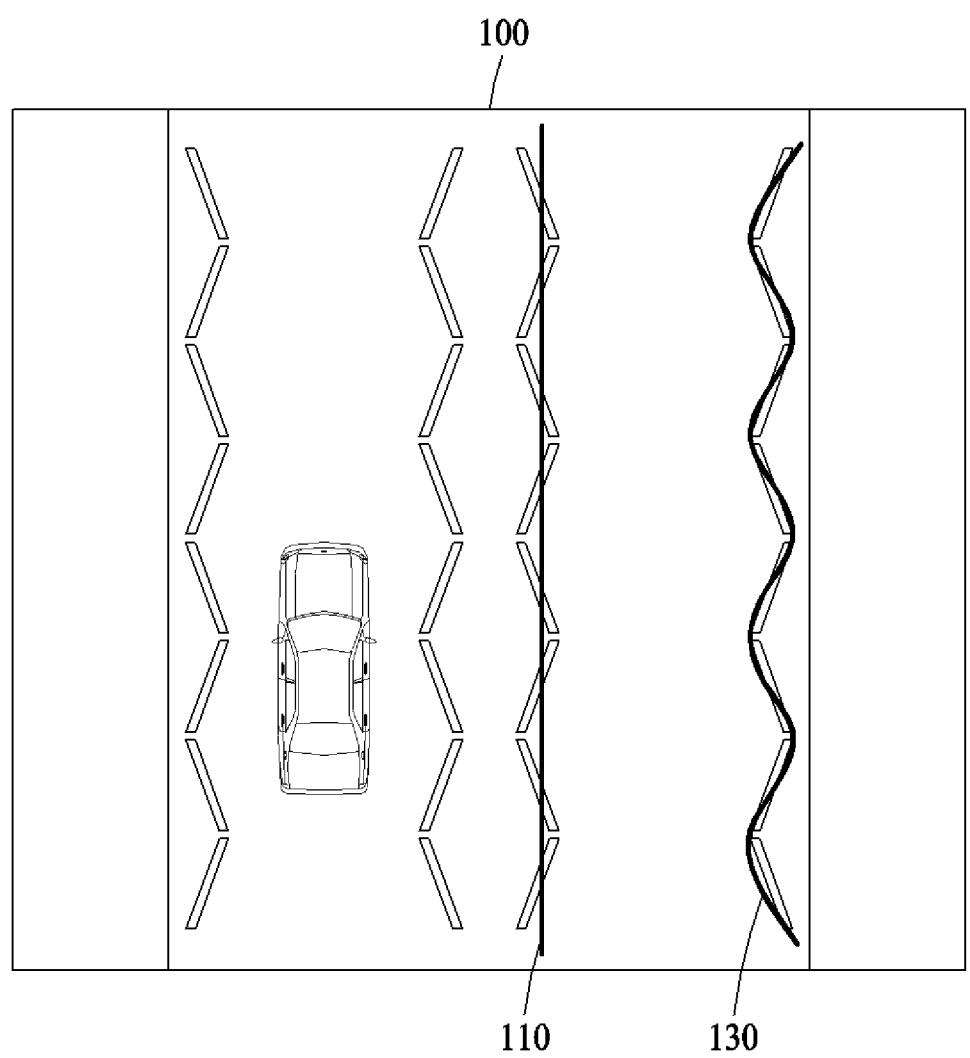
FIG. 1 illustrates an example of a line inaccurately detected from an input image.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and in view of the discussion of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Examples set forth hereinafter may include displaying, or be applied for, a virtual route or generating visual information included to assist steering of an autonomous vehicle in an augmented reality (AR) navigation system of a smart vehicle. The examples may include, or be used to interpret visual information and assist safe and pleasant driving in a device including an intelligent system such as a head-up display (HUD) installed for driving assistance or fully autonomous driving of a vehicle. The examples may be applied to, for example, an autonomous vehicle, an intelligent vehicle, a smart phone, and a mobile device. Hereinafter, the examples will be described in detail with reference to the accompanying drawings, wherein like drawing reference numerals are used for like elements.

FIG. 1 illustrates an example of a line inaccurately detected from an input image. Referring to FIG. 1, an input image 100 includes a zigzag line. The zigzag line is a curved line 130.

Line detection may be performed through a determined regression line using a regression equation formulated based on a feature point extraction. When the formulated regression equation does not match an actual shape of a line, an error may occur in the process of the line detection.

For example, the straight line 110 represents a case of fitting the zigzag line included in the input image 100 using a first-degree regression equation of an incorrect straight-line shape. Alternatively, the curved line 130 represents a more accurate fitting for the zigzag line included in the input image 100 using a third-degree regression equation of a curved shape.

In the example of FIG. 1, an accuracy on fitting the zigzag line included in the input image 100 increases using the third-degree regression equation in comparison to the first-degree regression equation. The accuracy on fitting the zigzag line also increases by adjusting a curvature of the third-degree regression equation. As such, the line detection is performed with the increased accuracy by applying a flexible regression equation instead of the formulated regression equation.

In an example, the line detection is performed with increased speed and accuracy by determining or predicting a regression line function corresponding to a road on which a vehicle is driving based on map information corresponding to a location of the vehicle, and detecting the line from a driving image, e.g., an input image or captured or obtained image, using the determined regression line function. The regression line function may be determined to be, for example, a first-degree polynomial equation, a second-degree polynomial equation, a third-degree polynomial equation, and a curve (for example, a clothoid) equation based on a road shape. Herein, it is noted that use of the term 'may' with respect to an example or embodiment, e.g., as to what an example or embodiment may include or implement, means that at least one example or embodiment exists where such a feature is included or implemented while all examples and embodiments are not limited thereto.

Herein, the term 'vehicle' refers to an example of a vehicle driving on the road and includes, for example, an autonomous or automated driving vehicle, and an intelligent or smart vehicle equipped with an advanced driver assistance system (ADAS), as examples. The term 'road' refers to a way on which vehicles drive, and includes various types of roads such as, for example, a highway, a national road, a local road, an expressway, and a motorway. The road includes one or more lanes. The term "lane" refers to a road space distinguished by lines marked on a surface of the road. A single lane is distinguished by left and right lines thereof. The 'lines' are various types of lines, for example, solid lines, broken lines, curved lines, and zigzag lines marked in white, blue or yellow on the surface of the road, as non-limiting examples.

Figure 2:
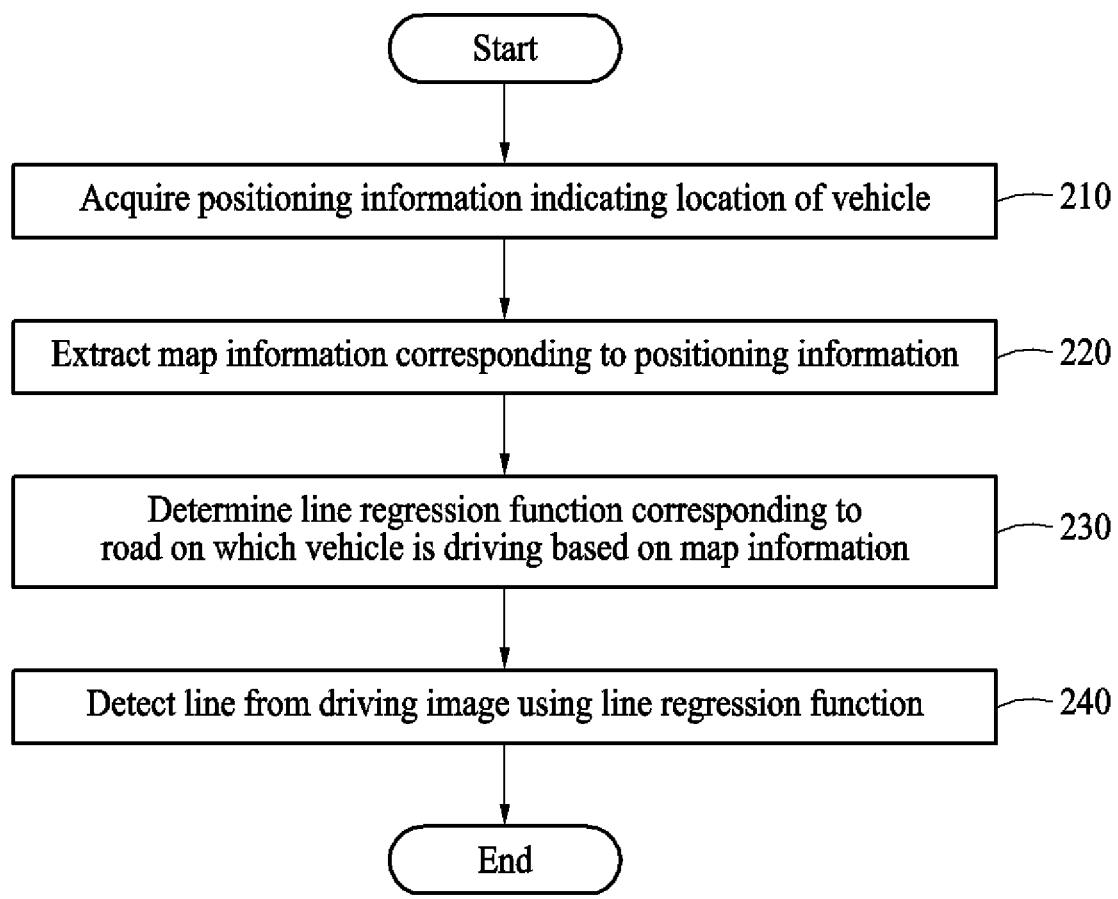
FIG. 2 illustrates an example of a method of detecting a line.

FIG. 2 illustrates an example of a method of detecting a line. Referring to FIG. 2, in operation 210, an apparatus with linearity detection, hereinafter also referred to as "detection apparatus," may acquire positioning information indicating a location of a vehicle. The detection apparatus may acquire positioning information including latitude, longitude and/or an altitude using, for example, a global positioning system (GPS) sensor. The detection apparatus also may acquire the positioning information using, for example, an acceleration sensor, an odometer, and a compass sensor.

In operation 220, the detection apparatus extracts map information corresponding to the positioning information. Here, the map information corresponding to the positioning information may correspond to map information of an area within a predetermined distance, for example, 100 meters (m) or 150 m, from a current location of the vehicle obtained based on the positioning information, or an area corresponding to a predetermined range including the positioning information.

The map information includes, for example, a map representing geographic features on the earth using symbols, characters, and images, map coordinates including latitudes, longitudes, and altitudes of the geographic features, and a plurality of global waypoints on a path represented on the map. Here, the plurality of global waypoints is a set of coordinates obtained at preset intervals when the vehicle drives in a single lane on a road. The map information may correspond to map information at a level of a general map or general navigation. The map information is stored in a memory, for example, a memory 1030 of FIG. 10, of the detection apparatus, or received from an external source of the detection apparatus through a communication interface, such as a communication interface 1040 of FIG. 10, of the detection apparatus.

The detection apparatus extracts global waypoints corresponding to the positioning information on a map, included in the map information. A method of extracting, by the detection apparatus, the global waypoints corresponding to the positioning information on the map will be further described with reference to FIG. 3.

In operation 230, the detection apparatus determines a regression line function corresponding to a road on which a vehicle is driving based on the map information. The regression line function corresponding to the road is understood as a regression line function reflecting the road shape or a regression line function for predicting the road shape. Since the regression line function indicates the road shape corresponding to a driving route of a vehicle and a location of the vehicle in a driving lane, the detection apparatus detects a line and/or a driving lane using the regression line function.

The regression line function is, for example, a determined straight line having curvature information of zero or a determined curved line having curvature information greater than zero. The curved line includes a curve having a curvature in one direction, a curve having curvatures in at least two directions, a curve corresponding to at least a portion of a circle, and a curve corresponding to at least a portion of an ellipse, as non-limiting examples. The regression line function is in the form of, for example, a polynomial equation such as $c_2x^2+c_1x+c_0$, or a clothoid that is a kind of a plane curve. The clothoid is a spiral that a change in curvature is inversely proportional to a length of the curve, and may correspond to a curve matching a driving trajectory of the vehicle when a steering wheel of the vehicle is rotated at a constant angular velocity.

In operation 230, the detection apparatus determines the regression line function using at least one of destination information and global waypoints corresponding to the positioning information, included in the map information. The detection apparatus may determine a degree of the regression line function, a regression weight (or a curvature weight) of the regression line function, and a lane weight based on the global waypoints and/or destination information, for example. A method of determining, by the detection apparatus, the regression line function will be further described with reference to FIGS. 4 through 8.

In operation 240, the detection apparatus detects a line from a driving image using the regression line function. The driving image is obtained or captured using, for example, a capturing device or image sensor mounted on the vehicle. The driving image includes a single driving image or a plurality of driving images.

The capturing device may be attached to a predetermined position, for example, windshield, a dashboard, and a rear-view mirror of the vehicle to capture driving images of a vehicle. The capturing device includes, for example, a vision sensor, an image sensor, or a device that performs a similar function. The capturing device may capture a single image or an image for each frame. The driving image may also be obtained or captured by a device other than the detection apparatus. The driving image is, for example, a driving image 510 of FIG. 5, a driving image 610 of FIG. 6, and a driving image 810 of FIG. 8, although examples are not limited thereto.

In an example, the detection apparatus uses the regression line function to determine and indicate a path of the vehicle, or generate and/or output various control parameters for controlling driving of the vehicle. The control parameters correspond to parameters for controlling, for example, a wheel steering of the vehicle, an accelerator for accelerating the vehicle, and a braking mechanism for decelerating the vehicle. Examples further include controlling the vehicle based on the captured parameters.

Figure 3:
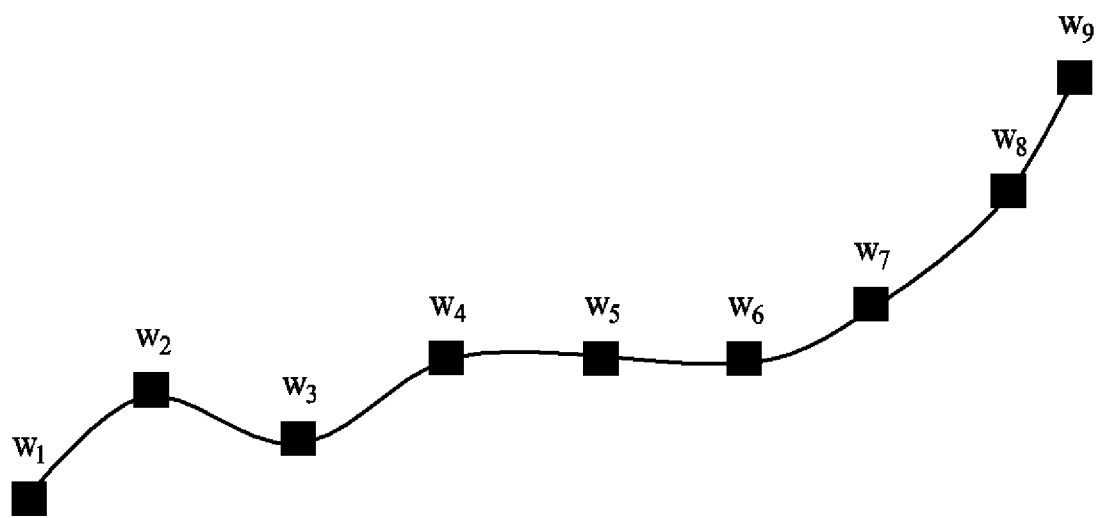
FIG. 3 illustrates an example of a method of extracting map information corresponding to positioning information.

FIG. 3 illustrates an example of a method of extracting map information corresponding to positioning information of a vehicle. Referring to FIG. 3, a plurality of global waypoints $W_1$, $W_2$, $W_3$, $W_4$, $W_5$, $W_6$, $W_7$, $W_8$, and $W_9$ is included in the map information. Here, the plurality of global waypoints $W_1$, $W_2$, $W_3$, $W_4$, $W_5$, $W_6$, $W_7$, $W_8$, and $W_9$ is, for example, a set of positional coordinates obtained at preset intervals when a vehicle drives in a single lane on a road or points corresponding to a road on which the vehicle is driving on a map. A global waypoint may include a coordinate value including a latitude, a longitude, and/or an altitude.

A detection apparatus extracts global waypoints located within a look-ahead distance, from positioning information. The term "look-ahead distance" refers to a distance to which information for driving of a vehicle is to be required, and is determined based on, for example, any one or any combination of a speed of the vehicle, a visible distance, a weather, a driving situation, a road condition, and a destination of the vehicle. Also, the look-ahead distance may correspond to a distance that appropriately represents the plurality of global waypoints $W_1$, $W_2$, $W_3$, $W_4$, $W_5$, $W_6$, $W_7$, $W_8$, and $W_9$ based on a degree of a regression line function.

For example, the predetermined look-ahead distance may be 100 m. When a speed of the vehicle is higher than a preset speed, for example, 60 kilometers per second (km/s), the detection apparatus may increase the look-ahead distance to a predetermined distance, e.g., 120 or 150 m. When the speed of the vehicle is lower than the preset speed, the detection apparatus reduces the look-ahead distance to a still further predetermined distance, e.g., 50 or 70 m. Also, when visibility is limited, due to environmental facts such as fog, rain, and snow, and affects a visible distance acquired from a driving image, the detection apparatus reduces the look-ahead distance. On a bright sunny day, when the visible distance is relatively long, the detection apparatus may increase the look-ahead distance.

When the road condition is unfavorable or not ideal due to, for example, a severe road curvature, the detection apparatus reduces the look-ahead distance. When the road condition is tolerable or moderately favorable, such as a smooth flat road, the detection apparatus may increase the look-ahead distance. Also, the detection apparatus reduces the look-ahead distance in traffic congestion, such as in rush hour and may increase the look-ahead distance during an uncongested traffic flow.

The detection apparatus extracts the global waypoints corresponding to the positioning information on the map and may acquire curvature information of a path through which the vehicle is to drive. For example, the detection apparatus determines the degree of a regression line function of a road to be driven by acquiring the curvature information from values of the global waypoints through regression analysis or determines a portion of the road to be weighted for regression analysis in the process of curvature regression.

When the vehicle is at the global waypoint $W_1$, a second-degree polynomial equation $c_2x^2+c_1x+c_0$ may be determined more suitable to be used for regression line of the global waypoints $W_1$ through $W_4$ in comparison to a first-degree polynomial equation or a third-degree polynomial equation, for example. In terms of the global waypoint $W_2$, a more accurate curve is obtained by assigning a weight to curvature information ($C_1$, $C_2$) indicating a curved degree of a curve.

Also, a first-degree polynomial equation $c_1x+c_0$ may be determined more suitable to be used for regression line of the global waypoints $W_4$ through $W_6$ in comparison to the second-degree polynomial equation or the third-degree polynomial equation, for example. As a weight assigned to a coefficient (CO of the first-degree polynomial equation increases, a more accurate straight line is obtained.

Figure 4:
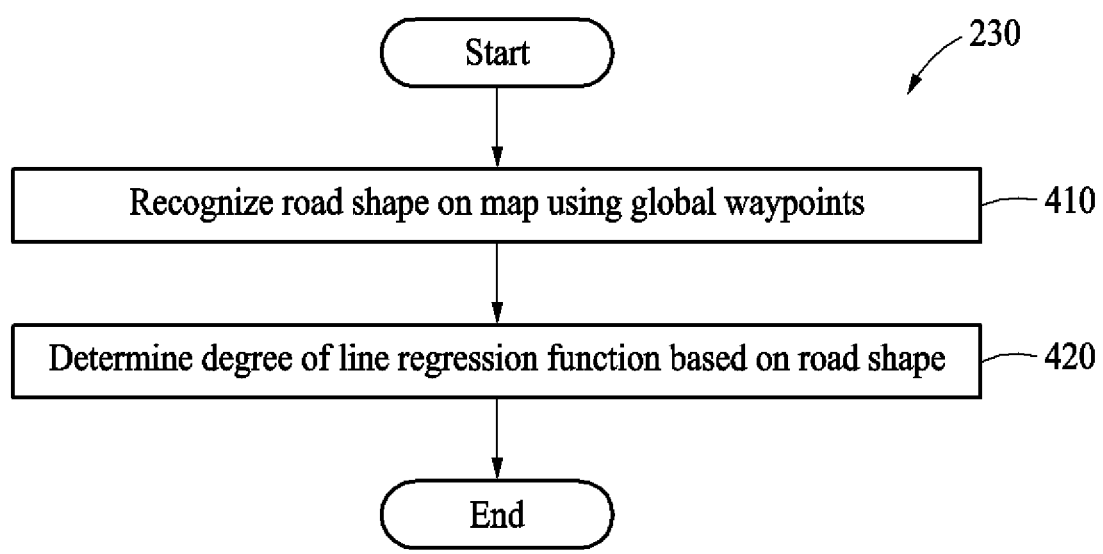
FIG. 4 illustrates an example of a method of determining a regression line function.

FIG. 4 illustrates an example of a method of determining a regression line function such as for the regression line function discussion above with respect to FIGS. 1-3. Referring to FIG. 4, in operation 410, a detection apparatus recognizes a road shape on a map using global waypoints. The detection apparatus recognizes the road shape on the map through a linear regression analysis on global waypoints on the map located within a look-ahead distance from a current location of a vehicle. The road shape includes, for example, a straight-line shape, a circular shape, a winding 'S' shape, a curved shape, or a zigzag shape. The curved shape includes, for example, includes a curved shape having a curvature in one direction, a curved shape having curvatures in at least two directions, a curved shape corresponding to at least a portion of a circle, and a curved shape corresponding to at least a portion of an ellipse.

In operation 420, the detection apparatus determines a degree of a regression line function based on the road shape. When the road shape is recognized to have a straight-line shape, the detection apparatus determines the degree of the regression line function to be a first degree, that is, determines the regression line function to be a first-degree polynomial equation. When the road shape is recognized to have a curved shape, the detection apparatus determines the degree of the regression line function to be a second degree, that is, determines the regression line function to be a second-degree polynomial equation. When the road shape is recognized to have a winding 'S' shape, the detection apparatus determines the degree of the regression line function to be a third degree. Also, the detection apparatus determines a regression weight, for example, a curvature weight of the regression line function through a regression analysis on global waypoints. The regression weight may correspond to a weight for curvature information corresponding to a coefficient, for example, $C_1$, $C_2$, and $C_3$ of the regression line function. For brevity, the following description will be provided based on an example in which a regression line function is a first-degree polynomial equation and a third-degree polynomial equation, noting that various regression line functions such as a second-degree polynomial equation, a third- or higher-degree polynomial equation, a circular equation, and an elliptic equation are also available in various examples.

Figure 5:
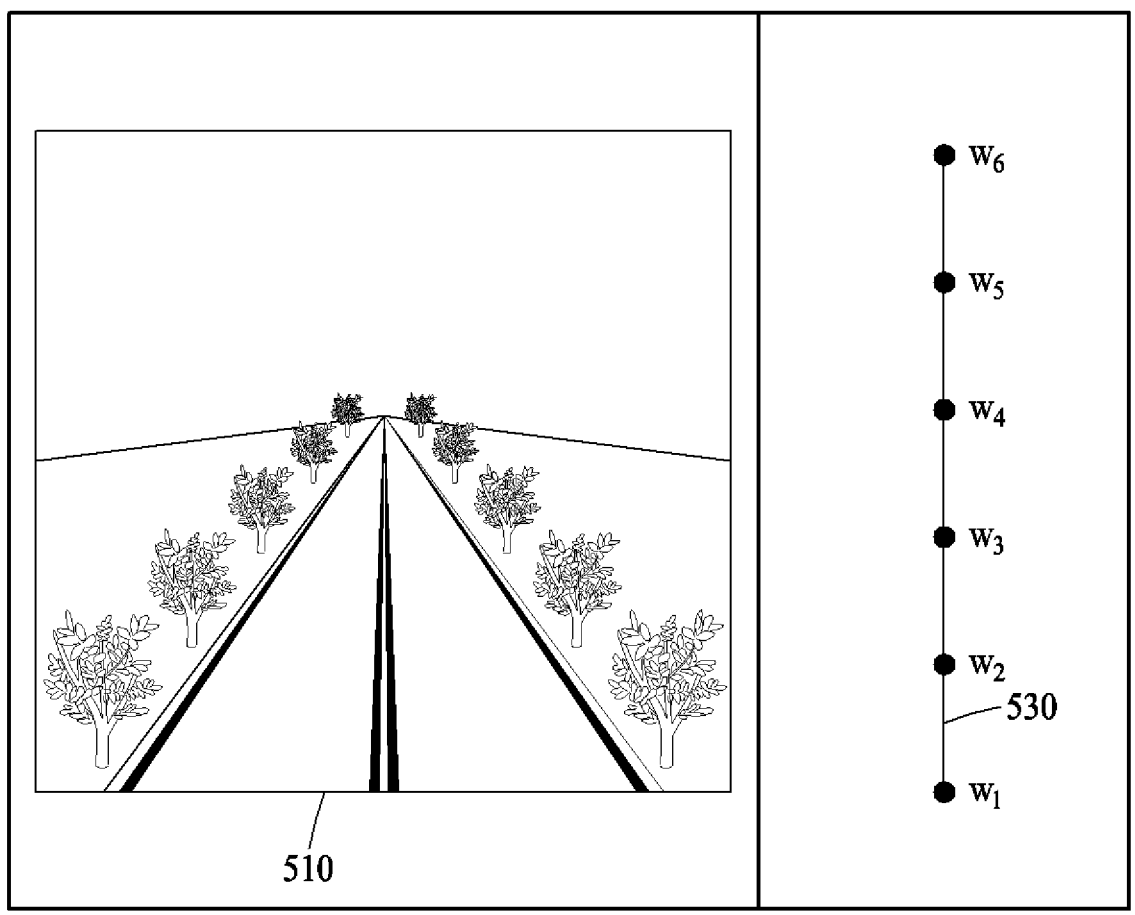
FIGS. 5 and 6 illustrate examples of the method of FIG. 4.

FIG. 5 illustrates an example of the method of FIG. 4. FIG. 5 illustrates the driving image 510 and map information 530 including global waypoints $W_1$, $W_2$, $W_3$, $W_4$, $W_5$, and $W_6$ corresponding to the driving image 510 on a map.

A detection apparatus recognizes that the road shape has a straight-line shape by performing regression on the global waypoints $W_1$, $W_2$, $W_3$, $W_4$, $W_5$, and $W_6$ extracted from the map information 530 based on a current location of a vehicle. The detection apparatus determines a first-degree polynomial equation, for example, $c_1x+c_0$ suitable for expressing the road shape corresponding to the straight-line shape, to be a regression line function. When performing regression line at the global waypoint $W_1$, the detection apparatus assigns a regression weight to a value of a polynomial coefficient $C_1$ such that a straight line is weighted. The detection apparatus detects a line from the driving image 510 using the first-degree polynomial equation $c_1x+c_0$.

Figure 6:
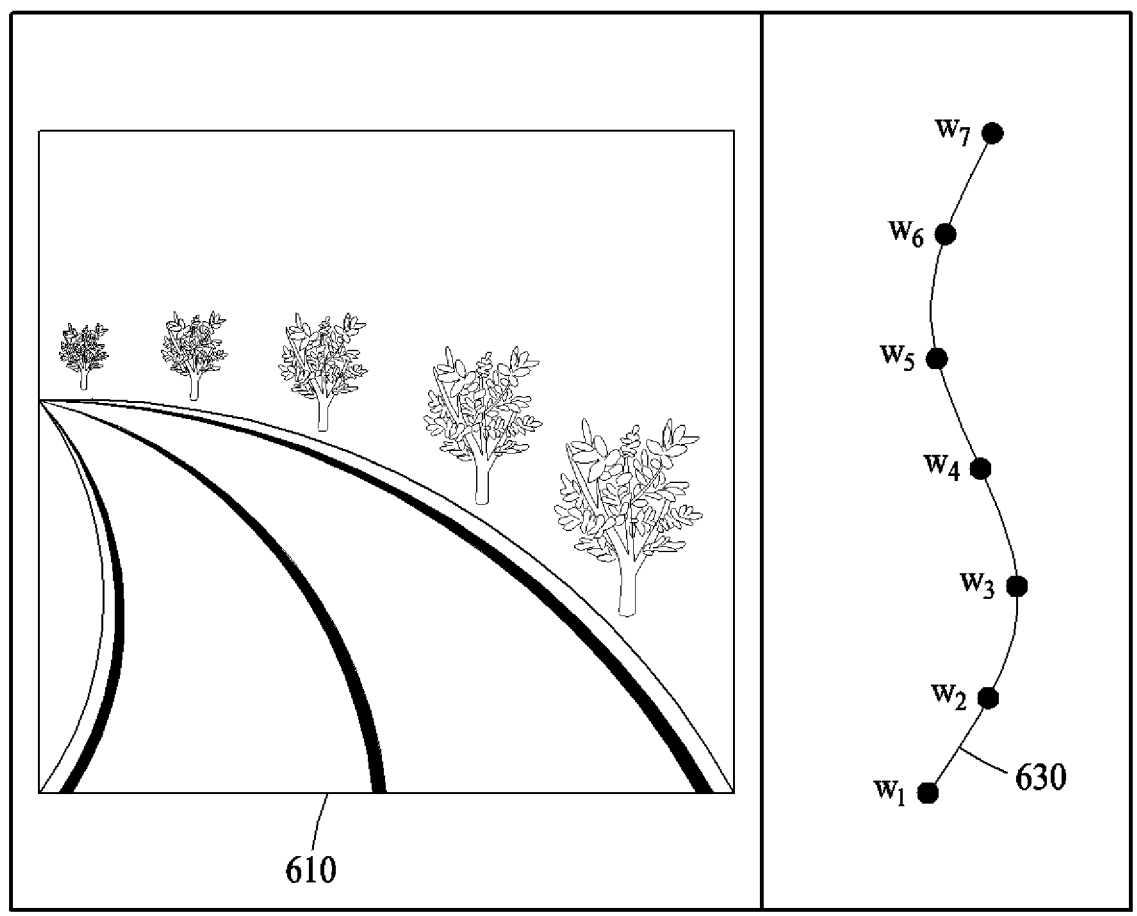

FIG. 6 illustrates an example of the method of FIG. 4. FIG. 6 illustrates the driving image 610 and map information 630 including global waypoints $W_1$, $W_2$, $W_3$, $W_4$, $W_5$, $W_6$, and $W_7$ corresponding to the driving image 610 on a map.

A detection apparatus recognizes that the road shape has a curved shape by performing regression analysis on the global waypoints $W_1$, $W_2$, $W_3$, $W_4$, $W_5$, $W_6$, and $W_7$ extracted from the map information 630 based on a current location of a vehicle.

The detection apparatus determines a regression line function suitable for expressing the road shape, for example, an S-curved shape. The detection apparatus determines a second-degree polynomial equation, for example, $c_2x^2+c_1x+c_0$ to be a regression line function of the global waypoint $W_1$, and determines a third-degree regression function, for example, $c_3x^3+c_2x^2+c_1x+c_0$ to be a regression line function of the global waypoint $W_3$.

The detection apparatus determines and assigns a greater regression weight or curvature weight to the regression line function of the global waypoint $W_3$ in comparison to the regression line function of the global waypoint $W_1$ to accurately express the curvature.

To appropriately represent a road shape corresponding to global waypoints, the detection apparatus detects a line using a regression line function to which a regression weight and a degree determined for each of the global waypoints or a predetermined interval of the global waypoints, thereby increasing accuracy and speed of line detection.

Figure 7:
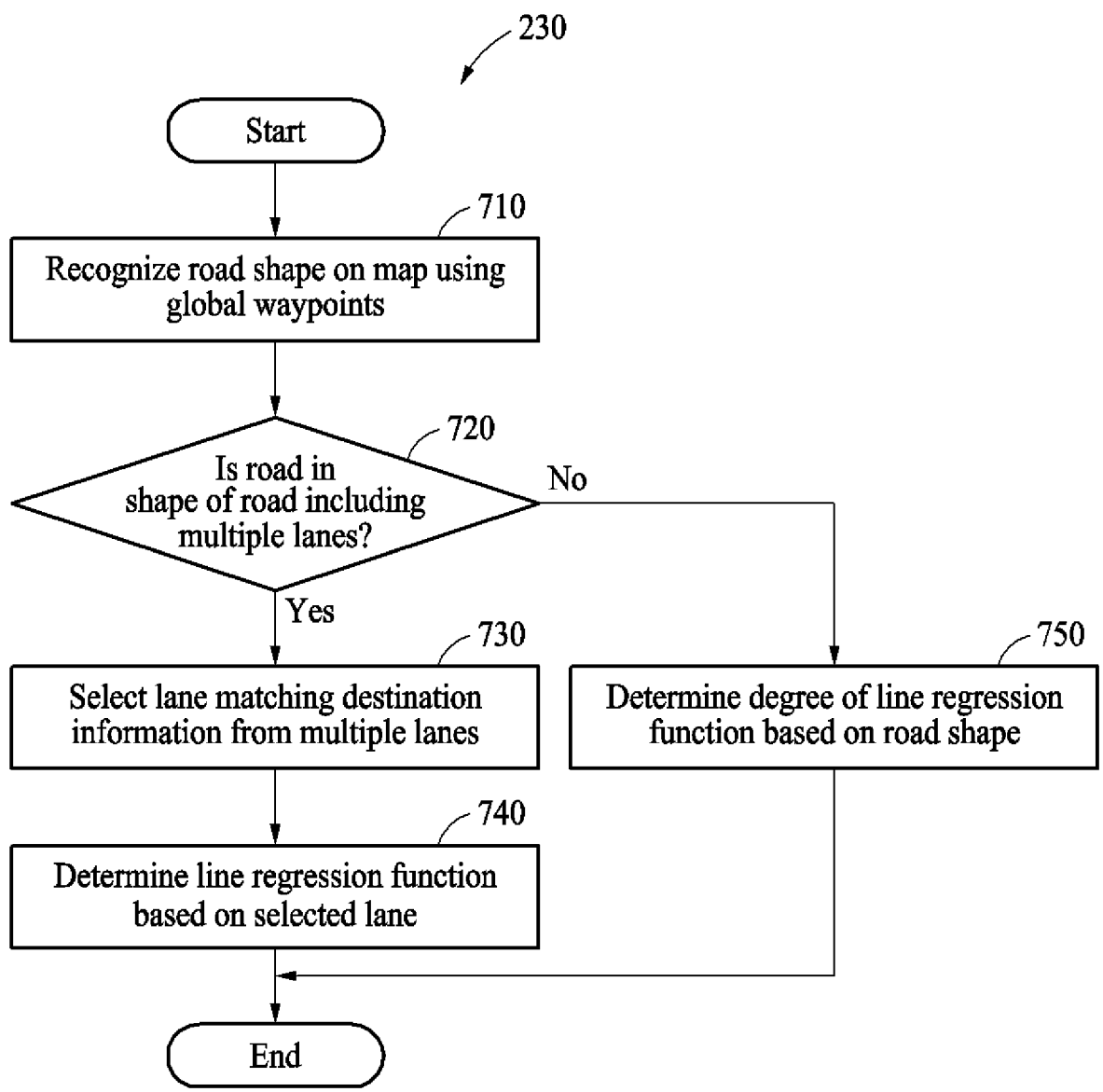
FIG. 7 illustrates an example of a method of determining of a regression line function.

FIG. 7 illustrates an example of a method of determining of a regression line function. Referring to FIG. 7, in operation 710, a detection apparatus recognizes a road shape on a map using global waypoints.

In operation 720, the detection apparatus determines or verifies whether the road shape is a shape of a road that includes multiple lanes. Here, it is understood that the multiple lanes include branch lanes into which a one-way road is divided into lanes for different ways and/or a plurality of lanes including ramp sections as road entrances or exits. The detection apparatus uses, for example, GPS information and map information to determine whether a plurality of next global waypoints is consecutive from one of the global waypoints on a driving path. When the plurality of next global waypoints is consecutive from one of the global waypoints on the driving path, the detection apparatus determines that the road shape is the shape of the road including the multiple lanes. When a single next global waypoint is consecutive from one of the global waypoints on the driving path, the detection apparatus determines that the road shape is a shape of a single lane road.

In an example, map information may further include information on a predetermined lane, for example, multiple lanes and a returning lane of a road including global waypoints on a path. In this example, the detection apparatus determines whether a road shape is the shape of the road including the multiple lanes based on the information on the predetermined lane.

When it is determined that the road shape is not the shape of the road including the multiple lanes in operation 720, the detection apparatus determines a degree of a regression line function based on the road shape, for example, the shape of the single lane road in operation 750.

When it is determined that the road shape is the shape of the road including the multiple lanes in operation 720, the detection apparatus selects a lane matching destination information from the multiple lanes in operation 730. For example, the detection apparatus assigns a lane weight of the lane matching the destination information such that the lane matching destination information is selected from the multiple lanes. The lane weight is also referred to as a lane priority.

In operation 740, the detection apparatus determines a regression line function based on the selected lane.

Figure 8:
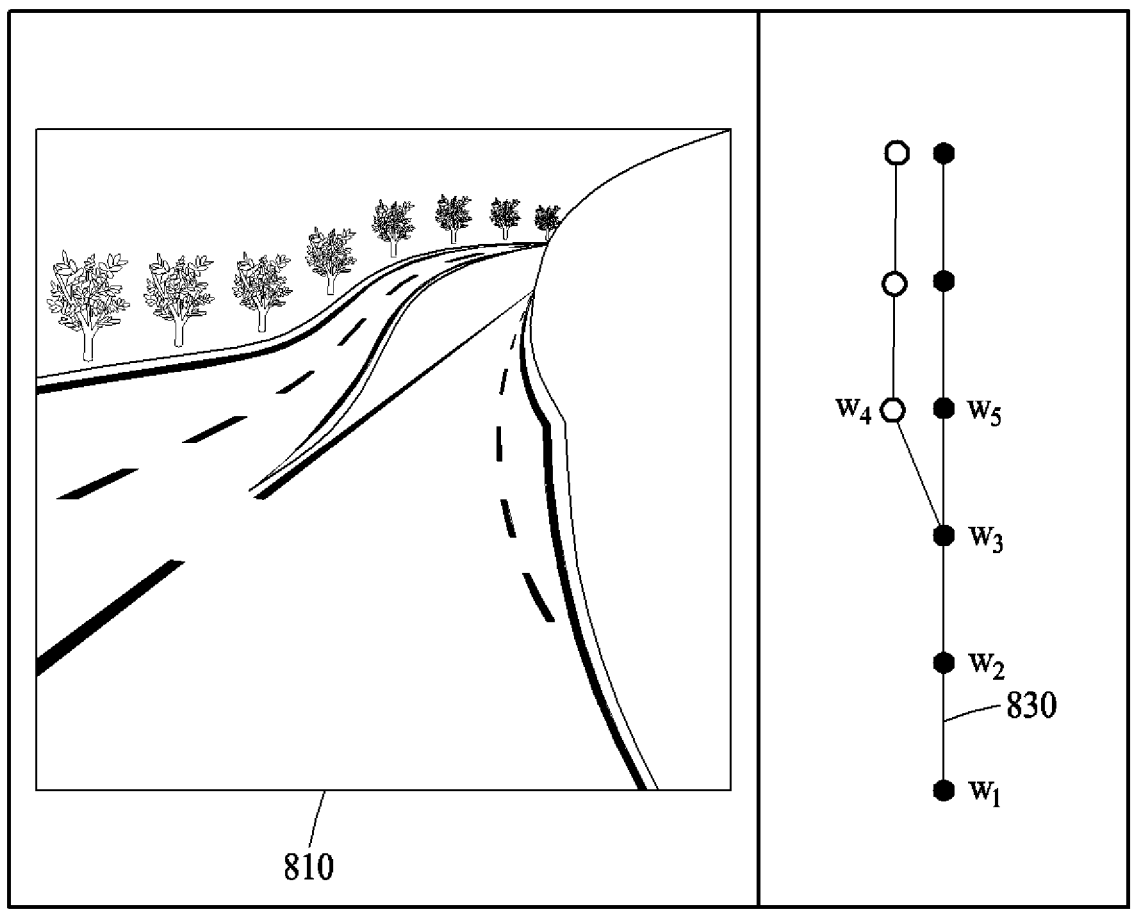
FIG. 8 illustrates an example of the method of FIG. 7.

FIG. 8 illustrates an example of the method of FIG. 7. FIG. 8 illustrates a driving image 810 and map information 830 including global waypoints $W_1$, $W_3$, $W_4$, and $W_5$ corresponding to the driving image 810 on a map.

A detection apparatus determines whether a plurality of next global waypoints is consecutive from one of the global waypoints on a driving path. Referring to FIG. 8, when the global waypoints $W_4$ and $W_5$ are consecutive from the global waypoint $W_3$, the detection apparatus determines that a road shape is a shape of a road including multiple lanes.

For example, a road connecting the global waypoints $W_3$ and $W_4$ may correspond to a path toward "Daejeon," a road connecting the global waypoints $W_3$ and $W_5$ correspond to a path toward "Daegu," and a destination of the vehicle is "Gwangju." Also, the vehicle enters a path from a section between the global waypoints $W_2$ and $W_3$ toward "Daejeon" using a first lane and a second lane and enters the path toward "Daegu" using a third lane.

The detection apparatus assigns a lane weight of a lane, for example, the third lane used to enter the path toward "Daegu," matching information on the destination, for example, to "Gwangju," of the vehicle such that the third lane towards "Daegu" is selected as a path. The detection apparatus determines the lane regression function based on the selected third lane.

Figure 9:
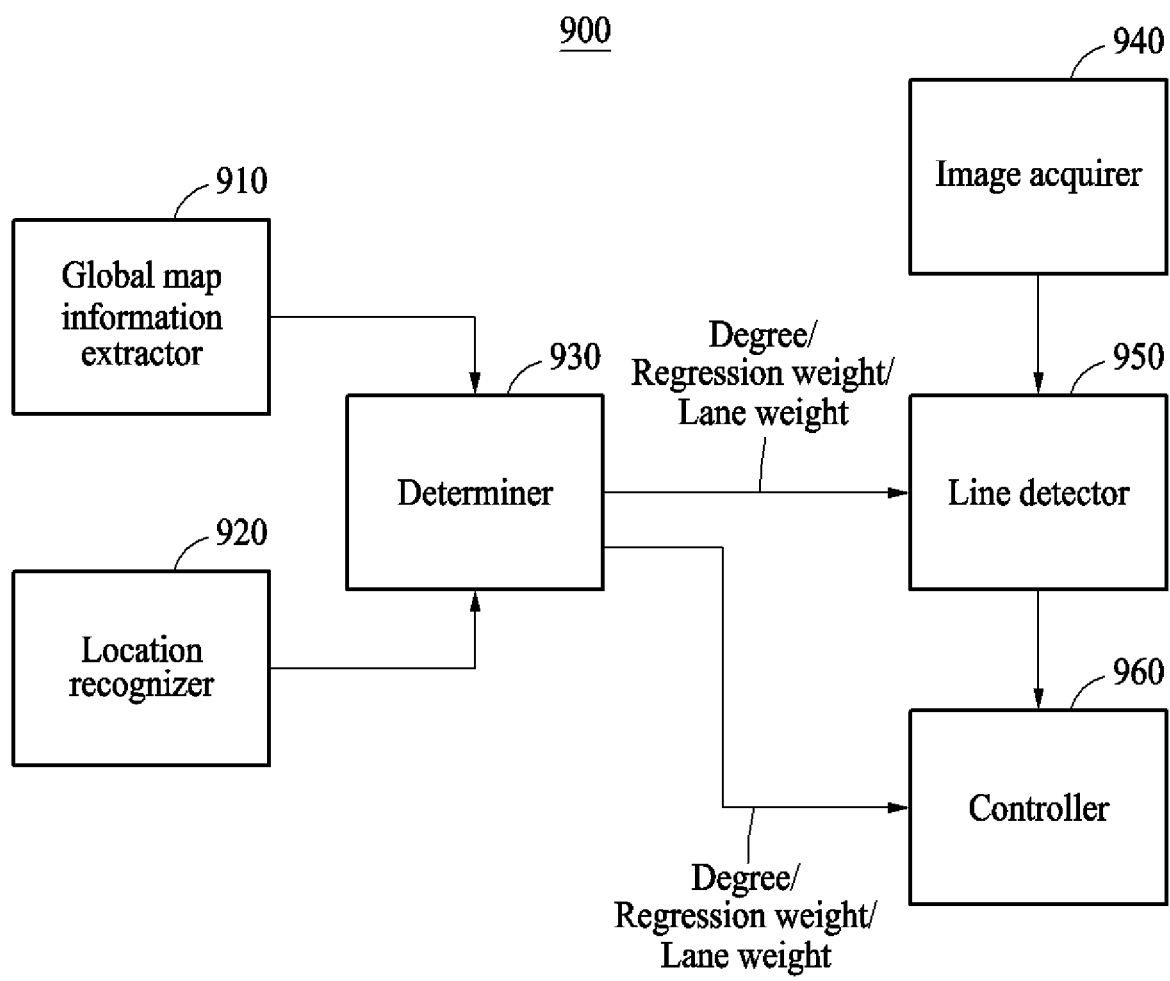
FIGS. 9 and 10 illustrate examples of a detection apparatus.

FIG. 9 illustrates an example of an apparatus with linearity detection. Referring to FIG. 9, a detection apparatus 900 includes a global map information extractor 910, a location recognizer 920, a determiner 930, an image acquirer 940, a line detector 950, and a controller 960, for example. In an example, the detection apparatus 960 may correspond to any one or any combination of the detection apparatus of FIGS. 1-8, although examples are not limited thereto.

The global map information extractor 910 extracts map information corresponding to a current location of a vehicle recognized by the location recognizer 920. The global map information extractor 910 extracts global waypoints corresponding to positioning information on a map.

The location recognizer 920 may acquire the current location of the vehicle by acquiring positioning information indicating a location of the vehicle. The location recognizer 920 may acquire the positioning information using, for example, a GPS sensor.

The determiner 930 determines information corresponding to a road on which the vehicle is driving. The information corresponding to the road on which the vehicle is driving includes a regression line function corresponding to the road. The determiner 930 provides, for example, a degree of the regression line function, a regression weight of the regression line function, and a lane weight to at least one of the line detector 950 and the controller 960.

The detection apparatus 900 performs control or line detection using the information corresponding to the road, for example, the degree, the regression weight, and the lane weight when the road includes multiple lanes, acquired by the determiner 930.

The image acquirer 940 may acquire a driving image of a front scene viewed from the vehicle using, for example, an image sensor or a camera attached to a front side of the vehicle.

The line detector 950 detects a line from the driving image using any one or any combination of the degree of the regression line function, the regression weight of the regression line function, and the lane weight determined by the determiner 930.

The controller 960 determines a local path of the vehicle based on the line detected by the line detector 950 and controls driving of the vehicle by generating information for the driving of the vehicle based on the local path. The information for the driving includes a control parameter for controlling any one or any combination of a driving direction of the vehicle, a wheel steering angle of the vehicle, and a speed of the vehicle.

Also, the controller 960 controls the vehicle in a horizontal direction by controlling a torque or a steering angle of the vehicle or controls the vehicle in a vertical direction by determining whether an object is present in a driving lane.

With respect to FIG. 9, above discussed global map information extractor 910, location recognizer 920, determiner 930, image acquirer 940, line detector 950, and controller 960 may each be representative of respective one or more processors, representative of being implemented by a same one or more processors, or representative of the corresponding operations being respectively implemented in various combinations by two or more processors. For example, each such one or more processors may be implemented through hardware only, e.g., through specialized circuitry, or through a combination of such hardware and instructions, such that when a corresponding processor executes such instructions, the processor is caused to perform the described operations. Thus, examples exist where each of the global map information extractor 910, location recognizer 920, determiner 930, image acquirer 940, line detector 950, and controller 960 are implemented through hardware only, and examples exist where each of the global map information extractor 910, location recognizer 920, determiner 930, image acquirer 940, line detector 950, and controller 960 are implemented through the combination of hardware and instructions. Also, in an example, less than all of the global map information extractor 910, location recognizer 920, determiner 930, image acquirer 940, line detector 950, and controller 960 may be implemented through the example combination of hardware and instructions, with the remaining global map information extractor 910, location recognizer 920, determiner 930, image acquirer 940, line detector 950, and controller 960 being implemented by hardware alone. Thus, as described herein, one or more processors configured to implement or perform the respective operations of the global map information extractor 910, location recognizer 920, determiner 930, image acquirer 940, line detector 950, and controller 960 is inclusive of all such examples of such hardware and/or hardware/instruction implementations.

Figure 10:
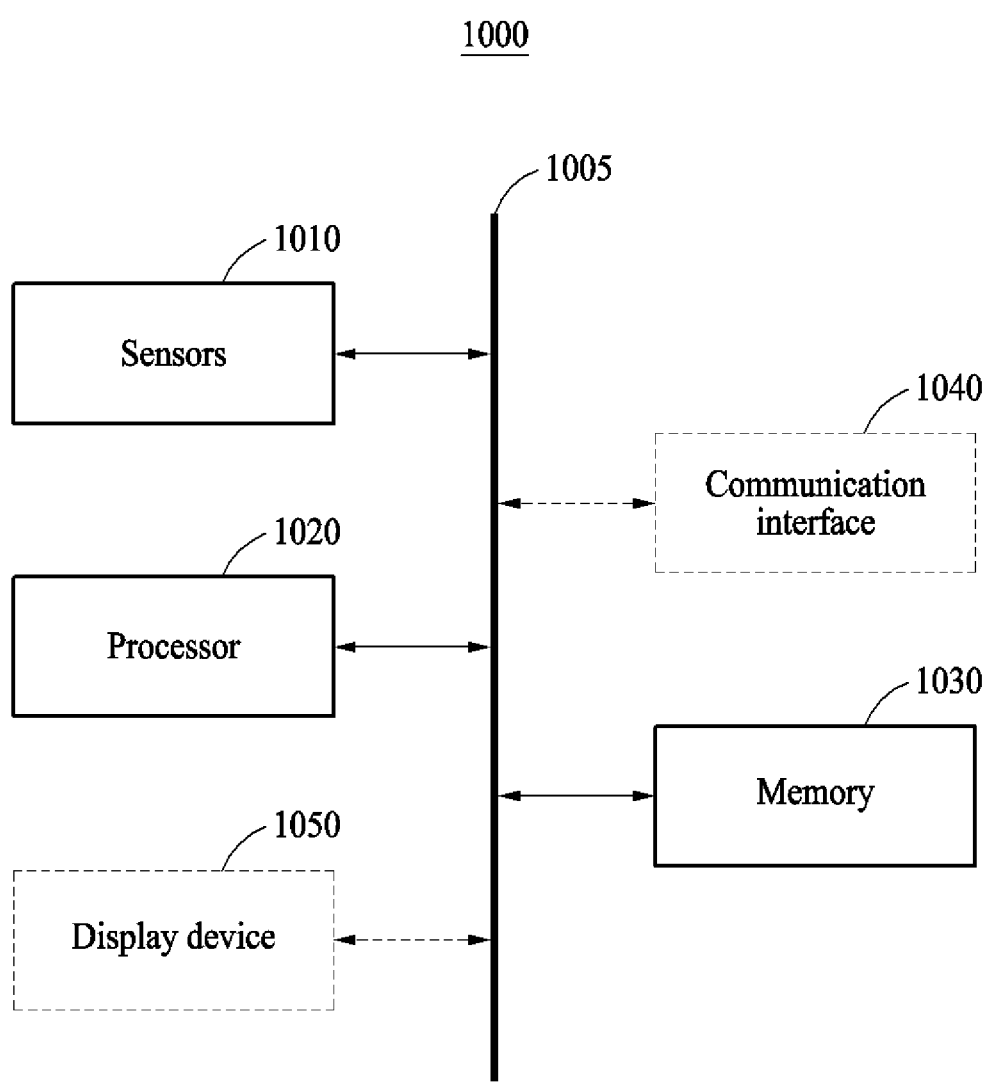

FIG. 10 illustrates an example of an apparatus with linearity detection. Referring to FIG. 10, a detection apparatus 1000 with linearity detection includes sensors 1010 and a processor 1020. The detection apparatus 1000 also includes the memory 1030, the communication interface 1040, and a display device 1050. The sensors 1010, the processor 1020, the memory 1030, the communication interface 1040, and the display device 1050 communicate with one another through a communication bus 1005. In an example, the detection apparatus 1000 may correspond to the detection apparatus described with respect to FIGS. 1-9.

The sensors 1010 include, for example, an image sensor, an accelerometer sensor, a compass sensor, a GPS sensor, a gyro sensor, an odometer, and a geomagnetic sensor. The sensors 1010 acquire positioning information indicating a location of a vehicle. Also, the sensors 1010 capture a driving image of the vehicle.

The processor 1020 extracts map information corresponding to the positioning information. The processor 1020 determines a regression line function corresponding to a road on which the vehicle is driving based on the map information. The processor 1020 detects a line from the driving image using the regression line function. In an example, the processor 1020 may correspond to any of the one or more processors discussed above with respect to FIG. 9.

The processor 1020 determines the regression line function using at least one of destination information and global waypoints corresponding to the positioning information on a map. The destination information and the global waypoints are included in the map information. The processor 1020 determines any one or any combination of a degree of the regression line function, a regression weight of the regression line function, and a lane weight using at least one of the destination information and the global waypoints.

The processor 1020 recognizes a road shape on the map using the global waypoints and determines a degree of the regression line function based on the road shape. The processor 1020 assigns a regression weight of the regression line function through a regression analysis on the global waypoints.

The processor 1020 recognizes a road shape on the map using the global waypoints. When the road shape is determined to be a shape of a road including multiple lanes, the processor 1020 assigns a lane weight of a lane matching the destination information among the multiple lanes.

The processor 1020 extracts global waypoints within a look-ahead distance from the positioning information on the map, included in the map information.

The detection apparatus 1000 receives sensing information through the communication interface 1040. For example, the communication interface 1040 receives sensing information from external sensors of the detection apparatus 1000. Also, the communication interface 1040 receives a driving image, map information, and GPS information from an external source of the detection apparatus 1000.

The processor 1020 outputs information for driving of the vehicle through the communication interface 1040. The information for driving of the vehicle includes, for example, a control parameter for controlling any one or any combination of a driving direction of the vehicle, a wheel steering angle of the vehicle, and a speed of the vehicle based on the local path of the vehicle.

The processor 1020 performs at least one of the methods, and their respective algorithms, described with reference to FIGS. 1 through 9.

The term 'processor,' as used herein, is a hardware-implemented data processing device having a circuit that is physically structured to execute desired operations. For example, the desired operations include code or instructions included in a program. The hardware-implemented data processing device includes, but is not limited to, for example, a microprocessor, a central processing unit (CPU), a processor core, a multi-core processor, a multiprocessor, an application-specific integrated circuit (ASIC), and a field-programmable gate array (FPGA).

The processor 1020 may execute instructions, which may control or cause the processor to implement the operations of the detection apparatus 1000. Codes of the instructions to be executed by the processor 1020 are stored in the memory 1030.

The memory 1030 stores the driving image and the map information. The memory 1030 stores various information generated during a processing operation of the processor 1020. Also, the memory 1030 includes a variety of data and programs. The memory 1030 includes a non-transitory computer-readable storage medium or a computer-readable storage device. The memory 1030 includes, for example, a random access memory (RAM), a dynamic RAM (DRAM), a static RAM (SRAM), a flash memory, and other types of nonvolatile memories well-known in the field of technology to which the present disclosure pertains.

The display device 1050 indicates or displays a line detected by the processor 1020 and the map information simultaneously or separately, such as by indicating or displaying a corresponding virtual route or visual information configured to assist steering of an autonomous vehicle, e.g., in an augmented reality (AR) navigation system or a smart vehicle example. Such indications may help the user to interpret visual information and assist safe and pleasant driving in an example device as or including an intelligent system such as an included head-up display (HUD), e.g., for driving assistance or in the fully autonomous driving of a vehicle example. The detection apparatus 1000 may be, or may be applied to, for example, an autonomous vehicle, an intelligent vehicle, a smart phone, or a mobile device.

The detection apparatus 900, the global map information extractor 910, the location recognizer 920, the determiner 930, the image acquirer 940, the line detector 950, the controller 960, the detection apparatus 1000, the sensors 1010, the processor 1020, the memory 1030, the communication interface 1040, and a display device 1050 described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method; comprising:
   acquiring a driving image;
   acquiring positioning information indicating a location of a vehicle;
   extracting map information corresponding to the positioning information;
   determining a regression line function corresponding to a road on which the vehicle is traveling based on the map information;
   detecting a linearity of the road from the driving image using the regression line function; and
   indicating the detected linearity.

2. The processor-implemented method of claim 1, wherein the determining of the regression line function comprises:
   determining the regression line function using either one or both of destination information and detected global waypoints corresponding to the positioning information on a map, included in the map information.

3. The processor-implemented method of claim 2, wherein the determining of the regression line function comprises:
   determining any one or any combination of any two or more of a degree of the regression line function, a regression weight of the regression line function, and a lane weight using either one or both of the destination information and the global waypoints, and
   detecting the linearity using the degree of the regression line function, the regression weight of the regression line function, and/or the lane weight.

4. The processor-implemented method of claim 3, wherein the determining of the regression line function comprises:
   recognizing a road shape on the map using the global waypoints; and determining the degree of the regression line function based on the recognized road shape.

5. The processor-implemented method of claim 3, wherein the determining of the regression line function comprises:
   assigning the regression weight of the regression line function through a regression analysis on the global waypoints.

6. The processor-implemented method of claim 3, wherein the determining of the regression line function comprises:
   recognizing a road shape on the map using the global waypoints;
   determining whether the road shape comprises multiple lanes; and
   in response to determining that the road shape comprises the multiple lanes, assigning the lane weight of a lane matching the destination information among the multiple lanes.

7. The processor-implemented method of claim 1, wherein the extracting of the map information comprises:
   extracting global waypoints corresponding to the positioning information on a map, included in the map information.

8. The processor-implemented method of claim 7, wherein the extracting of the global waypoints comprises:
   extracting global waypoints located within a predetermined look-ahead distance from the positioning information.

9. The processor-implemented method of claim 8, wherein the predetermined look-ahead distance is determined based on either one or both of a speed and a destination of the vehicle.

10. The processor-implemented method of claim 1, wherein the acquiring of the positioning information comprises:
    acquiring the positioning information using a global positioning system (GPS) sensor.

11. The processor-implemented method of claim 1, further comprising:
    determining a local path of the vehicle based on a line corresponding to the detected linearity;
    generating information for driving of the vehicle based on the local path,
    wherein
    the indicating of the detected linearity includes outputting the information for driving of the vehicle.

12. The processor-implemented method of claim 11, wherein the generating of the information for driving of the vehicle comprises:
    generating a control parameter controlling any one or any combination of any two or more of a driving direction of the vehicle, a wheel steering angle of the vehicle, and a speed of the vehicle based on the local path of the vehicle.

13. A non-transitory computer-readable storage medium storing instructions that, when executed by a processor, cause the processor to perform the method of claim 1.

14. A detection apparatus comprising:
one or more sensors configured to acquire a driving image and positioning information indicating a location of a vehicle; and
a processor configured to:
extract map information corresponding to the positioning information;
determine a regression line function corresponding to a road on which the vehicle is traveling based on the map information;
detect a linearity of the road from the driving image using the regression line function; and
indicate the detected linearity.

15. The detection apparatus of claim 14, wherein the processor is further configured to determine the regression line function using either one or both of destination information and global waypoints corresponding to the positioning information on a map, included in the map information.

16. The detection apparatus of claim 15, wherein the processor is further configured to determine any one or any combination of any two or more of a degree of the regression line function, a regression weight of the regression line function, and a lane weight using either one or both of the destination information and the global waypoints, and detect the linearity using the degree of the regression line function, the regression weight of the regression line function, and/or the lane weight.

17. The detection apparatus of claim 16, wherein the processor is further configured to recognize a road shape on the map using the global waypoints and determine the degree of the regression line function based on the road shape.

18. The detection apparatus of claim 16, wherein the processor is further configured to assign the regression weight of the regression line function through a regression analysis on the global waypoints.

19. The detection apparatus of claim 16, wherein the processor is further configured to:
recognize a road shape on the map using the global waypoints;
determine whether the road shape comprises multiple lanes; and
in response to determining that the road shape comprises the multiple lanes, assign the lane weight of a lane matching the destination information among the multiple lanes.

20. The detection apparatus of claim 16, wherein the processor is further configured to extract global waypoints corresponding to the positioning information on the map, included in the map information.

* * * * *